(12) United States Patent
Kojima

(10) Patent No.: US 12,552,156 B2
(45) Date of Patent: Feb. 17, 2026

(54) PRINTING APPARATUS, METHOD OF GENERATING PRINT DATA, AND NON-TRANSITORY AND COMPUTER-READABLE MEDIUM STORING COMPUTER

(71) Applicant: BROTHER KOGYO KABUSHIKI KAISHA, Nagoya (JP)

(72) Inventor: Takuya Kojima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 154 days.

(21) Appl. No.: 18/653,738

(22) Filed: May 2, 2024

(65) Prior Publication Data

US 2024/0399740 A1    Dec. 5, 2024

(30) Foreign Application Priority Data

Jun. 1, 2023    (JP) .................. 2023-091145

(51) Int. Cl.
*B41J 2/045* (2006.01)
*G06K 15/02* (2006.01)

(52) U.S. Cl.
CPC ...... *B41J 2/04541* (2013.01); *G06K 15/1805* (2013.01)

(58) Field of Classification Search
CPC ............... B41J 2/04541; B41J 2/04573; B41J 2/04583; B41J 2/04505; B41J 2/04508; B41J 2/04525; B41J 2/04588; B41J 2/0459; B41J 2/04591; B41J 2/04593; B41J 2/04595; G06K 15/1805
See application file for complete search history.

(56) References Cited

U.S. PATENT DOCUMENTS

| | | | |
|---|---|---|---|
| 2011/0273729 A1* | 11/2011 | Tanase | B41J 2/155 358/1.8 |
| 2011/0316921 A1 | 12/2011 | Azuma et al. | |
| 2011/0317177 A1* | 12/2011 | Kawatoko | H04N 1/48 358/1.5 |

FOREIGN PATENT DOCUMENTS

JP    2012-006260 A    1/2012

* cited by examiner

*Primary Examiner* — Kristal Feggins
(74) *Attorney, Agent, or Firm* — Baker Botts L.L.P.

(57) ABSTRACT

A printing apparatus includes: a main controlling circuit; a sub-controlling circuit group including a k-th sub-controlling circuit and a k+1-th sub-controlling circuit (k representing a natural number); and a head group including a k-th head and a k+1-th head. In a case where the main controlling circuit transmits print data to the sub-controlling circuit group, the k-th sub-controlling circuit obtains, from the print data, data with which printing is performed by the k-th head and transfers the print data, from which the obtained data is excluded, to the k+1-th sub-controlling circuit. The print data includes overlap data with which the printing is performed in an overlap area. The k+1-th sub-controlling circuit generates first print data and second print data based on the overlap data.

8 Claims, 6 Drawing Sheets

FIRST MASK

SECOND MASK

PRINTING APPARATUS, METHOD OF GENERATING PRINT DATA, AND NON-TRANSITORY AND COMPUTER-READABLE MEDIUM STORING COMPUTER

REFERENCE TO RELATED APPLICATIONS

This application claims priority from Japanese Patent Application No. 2023-091145 filed on Jun. 1, 2023. The entire content of the priority application is incorporated herein by reference.

BACKGROUND ART

There is a known printing apparatus in which a plurality of recording heads, each having a plurality of nozzles, is aligned in series in a direction orthogonal to a conveying direction of a sheet. Two recording heads of the plurality of recording heads, which are adjacent to each other, are disposed to be shifted with respect to each other in the conveying direction; in the two adjacent recording heads, an end part of one recording head and an end part of the other recording head construct an overlapping part in which the end parts overlap in the conveying direction. A mask is applied to print data for driving the nozzles of overlapping parts each corresponding to one of the plurality of recording heads, and driving of the nozzles is controlled based on the print data to which the mask is applied.

For example, in a case where the position of a recording head, of the plurality of recording heads, is deviated from a target position due to an error in dimension, there is such a fear that the density of an image formed on the sheet by ink ejected from the nozzles of each of the overlapping parts might deviate greatly from a target density. In the above-described printing apparatus, since the mask is applied to the print data, the variation in the density of the image formed on the sheet may be reduced by driving the nozzles of each of the overlapping parts, even if the position of the recording head deviates.

SUMMARY

In a case where a controller executes a generating process of applying the mask to the print data for driving the nozzles of each of the overlapping parts and of generating the print data after the mask has been applied, the number of the overlapping part is increased as the number of the recording head is increased. This increases the load of the generating process of the controller.

The present disclosure has been made in view of the above-described situation, and an object of the present disclosure is to provide a printing apparatus, a method of generating print data, and a non-transitory and computer-readable medium storing a computer program, each capable of reducing the load of the controller or preventing the load from increasing, in a case of generating the print data for driving the nozzles of the overlapping part in which the two adjacent heads are overlapped.

According to an embodiment of the present disclosure, a printing apparatus includes: a main controlling circuit; a sub-controlling circuit group which includes a plurality of sub-controlling circuits connected in series and including a k-th sub-controlling circuit and a k+1-th sub-controlling circuit (k representing a natural number); and a head group which includes a plurality of heads controlled by the sub-controlling circuit group and including a k-th head driven by the k-th sub-controlling circuit and a k+1-th head driven by the k+1-th sub-controlling circuit. In a case where the main controlling circuit transmits print data to the sub-controlling circuit group, the k-th sub-controlling circuit is configured to execute obtainment of, from the print data, data with which printing is performed by the k-th head, and to execute transfer of the print data, from which the obtained data is excluded, to the k+1-th sub-controlling circuit. The print data includes overlap data for printing in an overlap area where an area printed by the k-th head and an area printed by the k+1-th head overlap. The k+1-th sub-controlling circuit is configured to execute generation of, based on the overlap data, first print data for performing the printing in the overlap area by the k-th head and second print data for performing the printing in the overlap area by the k+1-th head.

The k+1-th sub-controlling circuit is configured to generate the first print data with which the k-th head performs the printing in the overlap area and the second print data with which the k+1-th head performs the printing in the overlap area. Namely, since the main controlling circuit is not required to generate the print data for printing in the overlap area, the increase in the load of the main controlling circuit can be prevented. Further, each of the sub-controlling circuits may generate the print data regarding an overlap area of the head possessed by the self and another head located on the upstream side thereof. Accordingly, even in a case where the number of heads is increased, the load of the generation of the data (the first data and the second data) for performing the printing in the overlap area is not increased in each of the sub-controlling circuits.

DESCRIPTION

Figure 1:
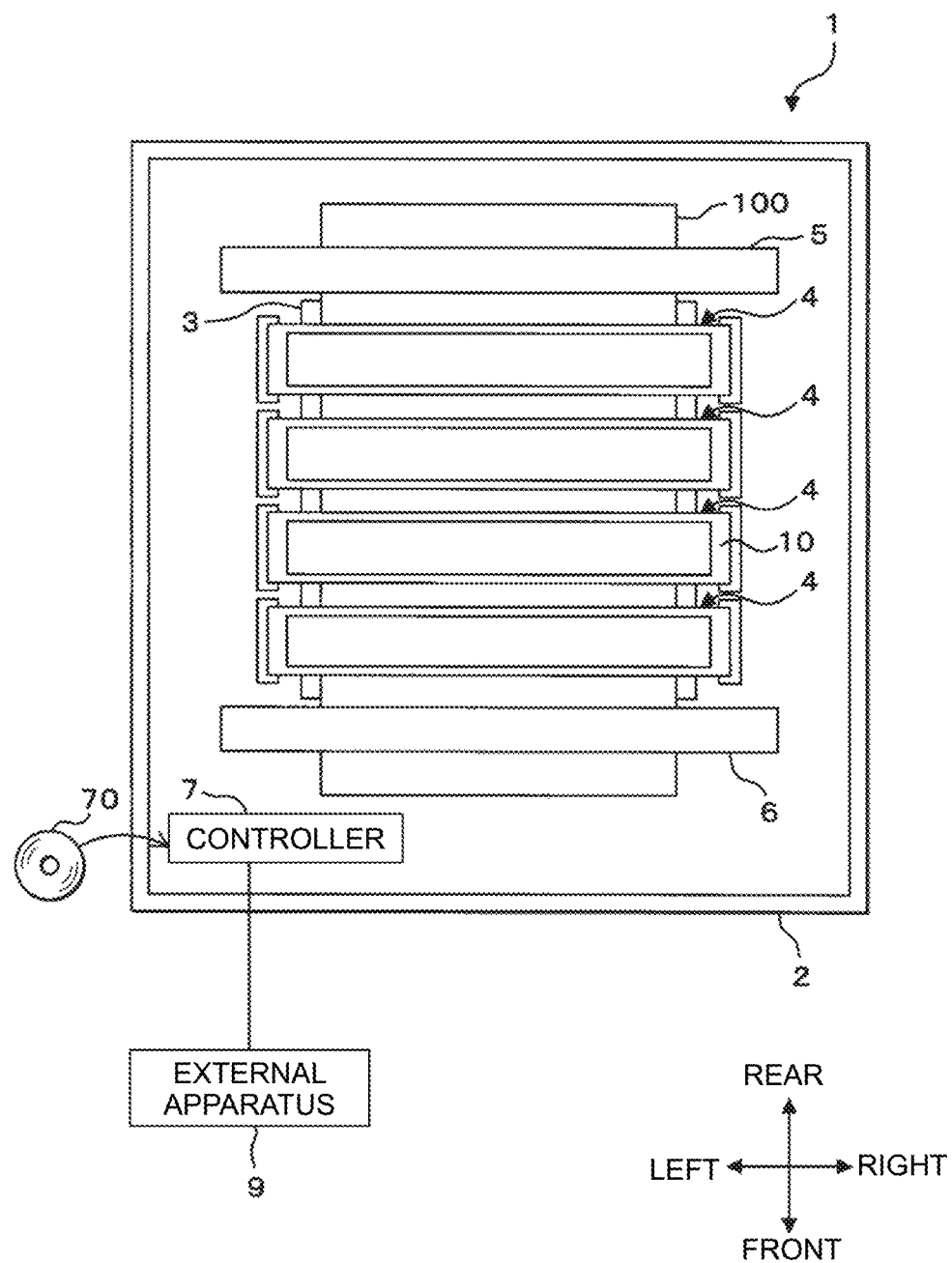
FIG. 1 is a plan view schematically depicting a printing apparatus.

A printing apparatus, according to an embodiment of the present disclosure, will be described, based on the drawings depicting the printing apparatus. In FIG. 1, a conveying direction of a print sheet 100 corresponds to the front-rear direction of the printing apparatus 1. The print sheet 100 is an example of a print medium. For example, a film or cloth may be used as the print medium. Further, the width direction of the print sheet 100 corresponds to the left-right direction of the printing apparatus 1. Further, a direction orthogonal to the front-rear direction and the left-right direction, namely, a direction perpendicular to the sheet surface of FIG. 1, corresponds to the up-down direction of the printing apparatus 1.

As depicted in FIG. 1, the printing apparatus 1 includes a platen 3, four ink-jet heads 4, two conveying rollers 5 and 6, and a controller 7 which are accommodated inside a case 2. The print sheet 100 passes on the upper surface of the platen 3. The four ink-jet heads 4 are aligned in the conveying direction above the platen 3. Each of the four ink-jet heads 4 is a head of a so-called line type. An ink from an ink tank (not depicted in the drawings) is supplied to each of the four ink-jet heads 4. Inks of mutually different colors are supplied, respectively, to the four ink-jet heads 4.

As depicted in FIG. 1, the two conveying rollers 5 and 6 are disposed, respectively, on the rear side and the front side of the platen 3. Each of the two conveying rollers 5 and 6 is driven by a non-illustrated motor and conveys the print sheet 100 on the platen 3 frontward. The controller 7 is connected to an external apparatus 9, such as a PC, so that data communication is possible between the controller 7 and the external apparatus 9, and the controller 7 is configured to drive the parts of the printing apparatus 1 based on print data transmitted from the external apparatus 9.

The ink-jet head 4 includes a plurality of heads 42. A plurality of nozzles 42a are formed in the lower surface of each of the plurality of heads 42. The plurality of heads 42 includes a first head row 421, having four heads 42, which are aligned in the left-right direction, and a second head row 422, having five heads 42 aligned in the left-right direction. The first head row 421 is disposed on the front side, and the second head row 422 is disposed on the rear side. The four heads 42 in the first head row 421 are hereinafter referred also to as heads 42F, and the five heads 42 of the second head row 422 are hereinafter referred also to as heads 42R.

In the left-right direction, four gaps are defined between the five heads 42R in the left-right direction. In the left-right direction, the position of each of the four heads 42F corresponds to the position of one of the four gaps. Namely, each of the four heads 42F is disposed between two adjacent heads 42R, of the five heads 42R, which are adjacent in the left-right direction. In the front-rear direction, a left-end part of each of the four heads 42F overlaps with a right-end part of a head 42R, which is on the left side of the two adjacent heads 42R; and a right-end part of each of the four heads 42F overlaps with a left end part of a head 42R which is on the right side of the two adjacent heads 42R. An area in which each of the heads 42F and one of the heads 42R overlap constructs an overlap area 42b.

In each of the heads 42F, nozzles 42a at each of the left and right end parts are disposed in the overlap area 42b. In the five heads 42R, nozzles 42a at the right end part of the right-most head 42R are disposed in the overlap area 42b, and nozzles 42a at the left end part of the left-most head 42R are disposed in the overlap area 42b. In heads 42R, between the right-most head 42R and the left-most head 42R, nozzles 42a at each of the left and right end parts of the heads 42R are disposed in the overlap area 42b. Note that the ink-jet head 4 includes a driving mechanism (not depicted in the drawings) and is movable to a flushing receiver (not depicted in the drawings) by the driving mechanism.

Figure 3:
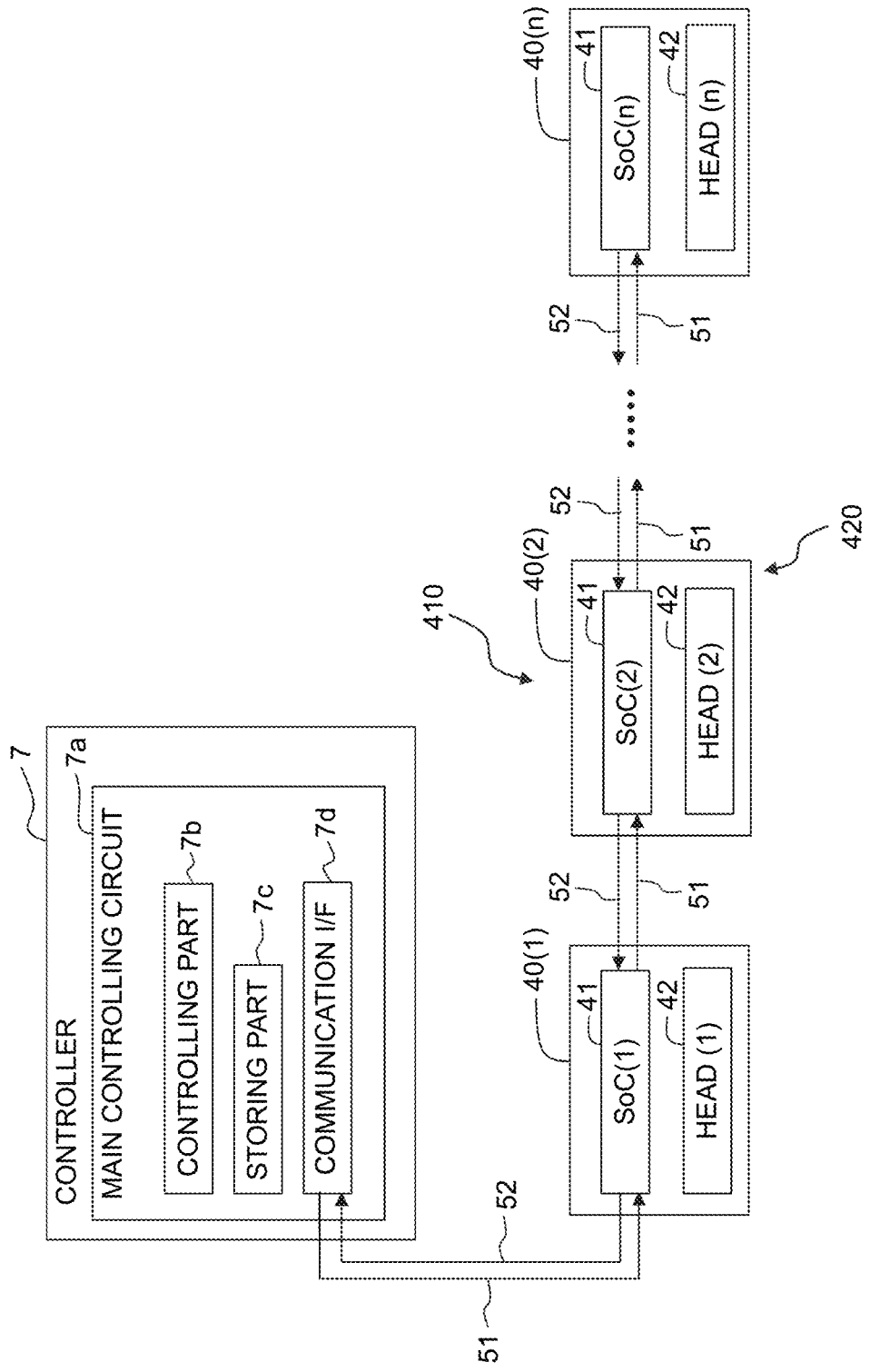
FIG. 3 is a block diagram of a controller and the ink-jet head.

FIG. 3 is a block diagram of the controller 7 and the ink-jet head 4. The controller 7 includes a main controlling circuit 7a. The main controlling circuit 7a includes a controlling part 7b, a storing part 7c, and a communication interface (I/F) 7d. The controlling part 7b includes a logic circuit, such as an FPGA. Note that the controlling part 7b may include a processor such as, for example, a CPU or an ASIC. The storing part 7c includes a main memory and an auxiliary memory. The main memory is exemplified by RAM. The auxiliary memory is exemplified by a ROM and a rewritable storage medium such as, for example, an EEPROM (a registered trademark of Renesas Electronics Corporation), a flash ROM, a hard disc, etc. A control program is stored in the auxiliary memory. The controlling part 7b is configured to read the control program from the auxiliary memory and into the main memory and to execute the control program. The control program may be installed in the auxiliary memory from a storage medium 70 (see FIG. 1), which is exemplified by an optical disc or a portable flash memory. Note that the control program may be downloaded to the auxiliary memory from a server which is connected to the printing apparatus 1 via a communication network. The communication I/F 7d is connected to a forward direction-communicating route 51 and a backward direction-communicating route 52. The controller 7 is configured to control the printing apparatus 1 based on the control program.

The ink-jet head 4 includes a plurality of head modules 40. The plurality of head modules 40 is aligned, for example, in the left-right direction; the plurality of head modules 40 are connected in series via the forward direction-communicating route 51 and is connected in series via the backward direction-communicating route 52. The plurality of head modules 40 has, for example, a first head module 40(1), a second head module 40(2), a third head module 40(3) . . . , and an n-th head module 40(n). Note that the "n" represents a natural number. Among the plurality of head modules 40, the first head module 40(1) is disposed at the leftmost position, and the n-th head module 40(n) is disposed at the rightmost position. The first head module 40(1) is disposed at a position closest to the controller 7 among all the plurality of head modules 40, and the n-th head module 40(n) is disposed at a position farthest from the controller 70 among all the plurality of head modules 40.

In the following description, "k" represents a natural number which is "n" or less. A k-th head module 40(k) includes an SoC 41 and a head 42. In the following description, the SoC 41 of the k-th head module 40(k) is also referred to as an SoC (k), and the head 42 of the k-th head module 40(k) is also referred to as a head (k). The SoC (k) corresponds to a "sub-controlling circuit." The SoC (k) includes a controlling part 41a, a storing part 41b, a communication I/F 41c, a communication I/F 41d, a data processing part 41e, and a mask processing part 41f. The mask processing part 41f includes a buffer 41g. The buffer 41g includes, for example, an EEPROM and a flash ROM. The controlling part 41a includes, for example, a logic circuit or a processor. The storing part 41b includes a rewritable storage medium such as an EEPROM, a flash ROM, a hard disc, a ROM, and a RAM. Each of the communication I/Fs 41c and 41d is connected to the forward-direction-communicating route 51 and the backward-direction communicating route 52.

The direction of transmitting data in the forward direction-communicating route 51 is a direction from an SoC (1) toward an SoC (n), namely, the forward direction. The forward direction is a direction from the upstream toward the downstream. The direction of transmitting data in the backward direction-communicating route 52 is a direction from the SoC (n) toward the SoC (1), namely, the backward direction. The backward direction is a direction from the downstream toward the upstream.

Figure 2:
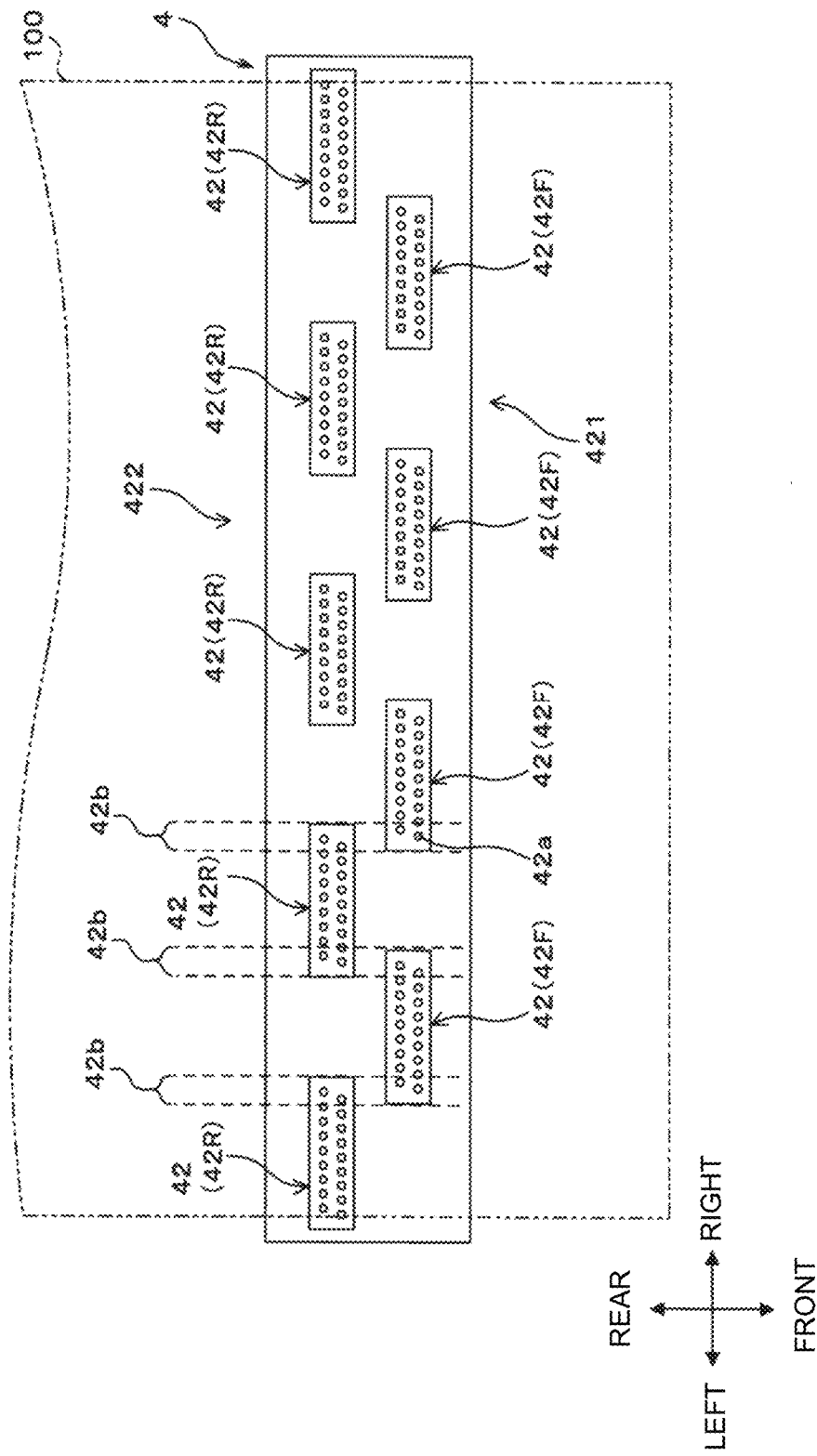
FIG. 2 is a plan perspective view of an ink-jet head.

Note that the left in FIG. 2 corresponds to the upstream and the right in FIG. 2 corresponds to the downstream. The leftmost head 42 depicted in FIG. 2 is a head disposed at the upstream-most position, and the rightmost head 42 depicted in FIG. 2 is a head disposed at the downstream-most position. A plurality of SoCs, each of which corresponds to one of the heads 42 in FIG. 2, is connected in series by the forward direction-communicating route 51 and the backward direction-communicating route 52.

A plurality of SoCs, namely, an SoC (1) to an SoC (n), construct an SoC group 410, and the plurality of heads 42, namely, a head (1) to a head (n), construct a head group 420 (see FIG. 3). The SoC group 410 corresponds to a "sub-controlling circuit group".

Figure 5:
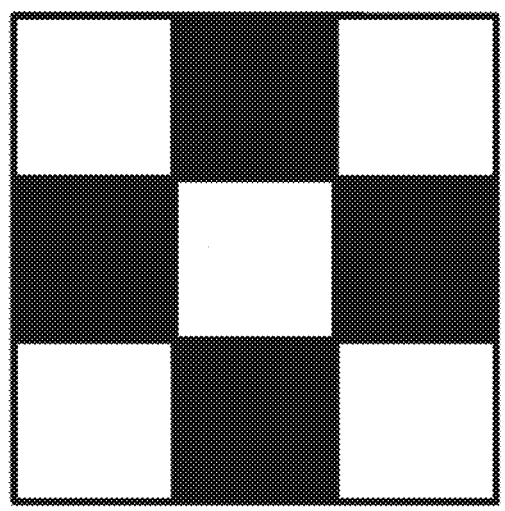
FIG. 5 is a conceptual view depicting an example of a mask in a mask processing part.
Figure 5:
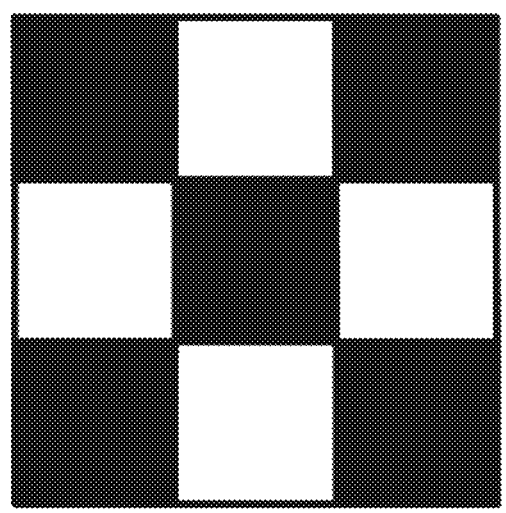

For example, as depicted in FIG. 5, the mask processing part 41 includes a first mask and a second mask. The first mask and the second mask are in an exclusive relationship; each of the first and second masks has 3 pixels×3 pixels and is repeatedly applied in the conveying direction. In each of the first and second masks, the bit of a black (solid) pixel represents 1 (one) and means ejection. Further, in each of the first and second masks, the bit of a white (hollow) pixel represents 0 (zero) and means non-ejection. Mask data representing the first mask and the second mask is previously stored, for example, in a memory (not depicted in the drawings) of the mask processing part 41.

The main controlling circuit 7*a* transmits the print data to the SoC group 410. The SoC group 410 transfers the print data to the SoC (1) up to the SoC (n). Here, as an example, the data processing in an SoC (k), an SoC (k+1), and an SoC (k+2) included in the SoC group 410 will be described. Note that the print data transmitted by the main controlling circuit 7*a* includes data D (k), data D (k+1), and data D (k+2), which will be described later.

Figure 4:
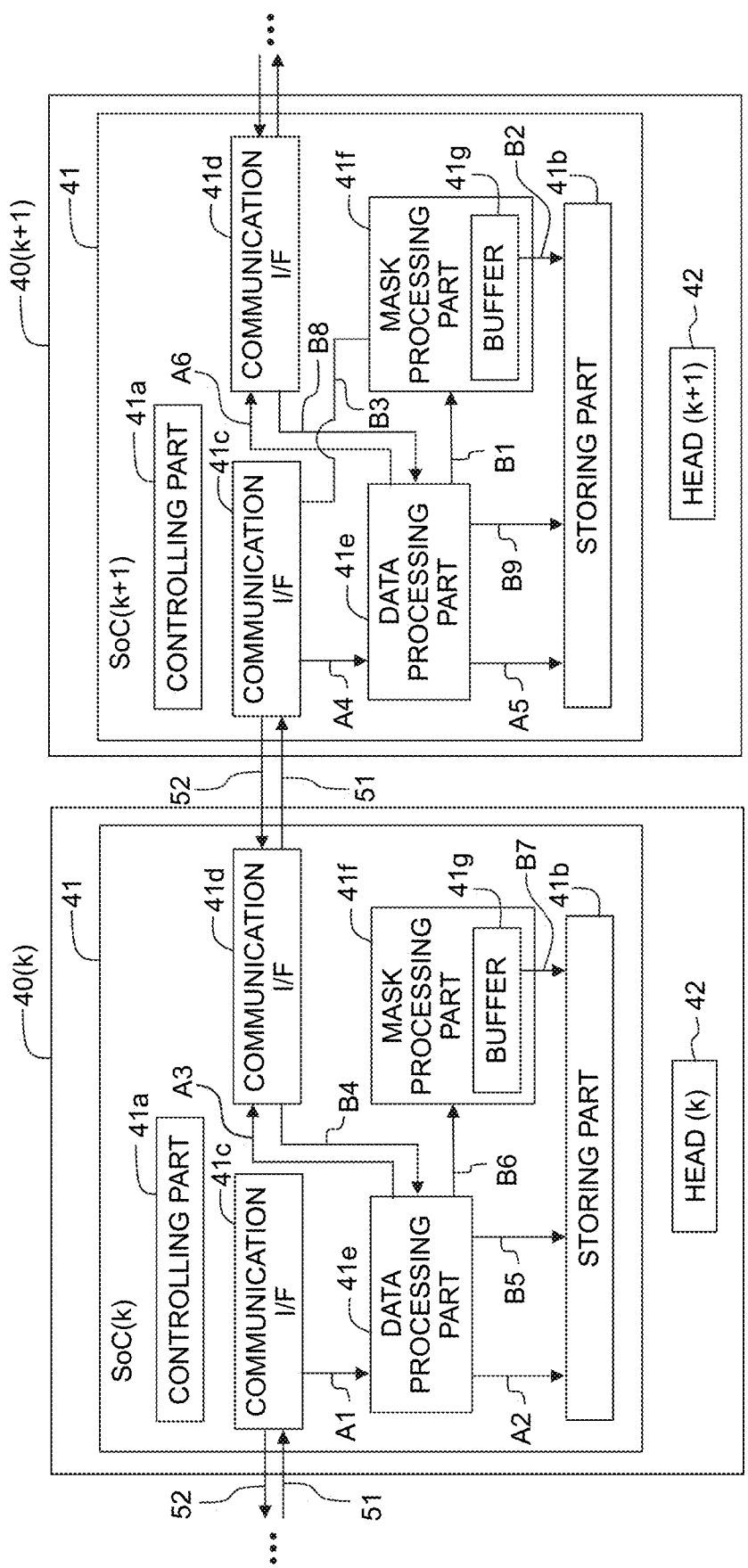
FIG. 4 is a block diagram of a k-th head module ("k" represents a natural number which is "n" or less).

The data processing part 41*e* of the SoC (k) obtains the print data from the upstream side, namely, from an SoC (k−1), via the communication I/F 41*c* (see arrow A1 of FIG. 4). The data processing part 41*e* of the SoC (k) obtains, from the print data, the data D (k) corresponding the self, namely, to the SoC (k), and stores the data D (k) in the storing part 41*b* (see arrow A2 of FIG. 4). The data processing part 41*e* of the SoC (k) transmits the print data from which the data D (k) is excluded to the downstream side, namely, to the SoC (k+1), via the communication I/F 41*d* (see arrow A3 of FIG. 4).

Figure 6:
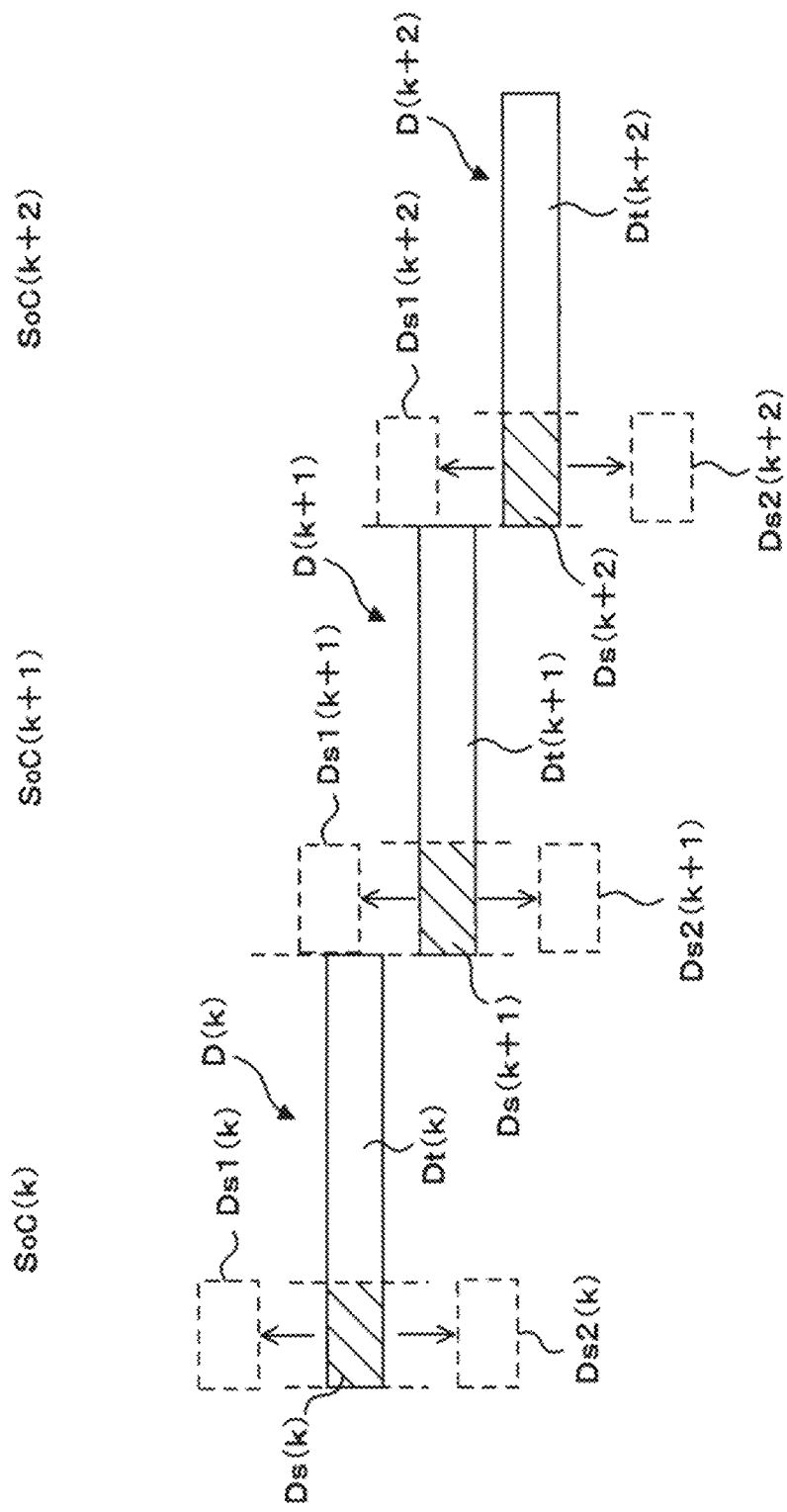
FIG. 6 is a view depicting data processing in an SoC.

The data D (k) includes overlap data Ds (k) and non-overlap data Dt (k) (see FIG. 6). The overlap data Ds (k) is data for performing printing in an overlap area 42*b* in which an area printed by the head (k−1) and an area printed by the head (k) overlap. The non-overlap data Dt (k) is data which does not include the overlap data Ds (k) and does not include overlap data Ds (k+1) for performing printing in an overlap area 42*b* in which the area printed by the head (k) and an area printed by a head (k+1) overlap. Namely, the non-overlap data Dt (k) is data for performing printing in an area in which the overlap area 42*b* is excluded from the area printed by the head (k). The SoC (k) obtains data for printing by the head (k), in which the overlap data Ds (k+1) is excluded from the print data.

The data processing part 41*e* of the SoC (k) transmits the overlap data Ds (k) to the mask processing part 41*f* (see arrow B6 of FIG. 4) of the SoC (k). The mask processing part 41*f* of the SoC (k) stores the overlap data Ds (k) in the buffer 41*g* of the self. The mask processing part 41*f* of the SoC (k) generates data Ds2 (k) by, for example, applying the second mask to the overlap data Ds (k) and stores the data Ds2 (k) in the storing part 41*b* of the SoC (k) (see arrow B7 of FIG. 4). The mask processing part 41*f* of the SoC (k) generates data Ds1 (k) by, for example, applying the first mask to the overlap data Ds (k), and transmits the data Ds1 (k) to the upstream side, namely, to the SoC (k−1). Note that "k−1" represents a natural number.

The mask processing in the mask processing part 41*f* of the SoC (k) is executed, for example, in the following manner. The mask processing part 41*f* stores, in the buffer 41*g* of the self, the overlap data Ds (k) corresponding to a predetermined number of lines. The predetermined number of lines is a number corresponding to the size of each of the first mask and the second mask. In a case where the mask processing part 41*f* stores the data Ds (k) corresponding to the predetermined number of lines, the mask processing part 41*f* generates the data Ds2 (k) by, for example, applying the second mask to the data Ds (k) corresponding to the predetermined number of lines, and generates the data Ds1 (k) by, for example, applying the first mask to the data Ds (k) corresponding to the predetermined number of lines. The mask processing can be executed efficiently by accumulating the overlap data Ds (k) corresponding to the number of the lines corresponding to the size of each of the first mask and the second mask and by applying each of the first mask and the second mask to the accumulated overlap data Ds (k). The predetermined number of lines may be set in accordance with the size of the mask and may be, for example, 3 to 4 lines, or lines of which number corresponding to 1 (one) page.

The data processing part 41*e* of the SoC (k+1) obtains the print data from the upstream side, namely, from the SoC (k), via the communication I/F 41*c* (see arrow A4 of FIG. 4). The data processing part 41*e* of the SoC (k+1) obtains, from the print data, data D (k+1) corresponding to the self, namely, to the SoC (k+1), and stores the data D (k+1) in the storing part 41*b* (see arrow A5 of FIG. 4) of the SoC (k+1). The data processing part 41*e* of the SoC (k+1) transmits the print data from which the data D (k+1) is excluded to the downstream side, namely, to the SoC (k+2) (see arrow A6 of FIG. 4).

The data D (k+1) includes the overlap data Ds (k+1) and non-overlap data Dt (k+1) (see FIG. 6). The overlap data Ds (k+1) is data for performing printing in an overlap area 42*b* in which the area printed by the head (k) and an area printed by the head (k+1) overlap. The non-overlap data Dt (k+1) is data which does not include the overlap data Ds (k+1) and does not include overlap data Ds (k+2) for performing printing in an overlap area 42*b* in which the area printed by the head (k+1) and an area printed by a head (k+2) overlap. The overlap data Ds (k+2) corresponds to "second overlap data." Namely, the non-overlap data Dt (k+1) is data for performing printing in an area in which the overlap area 42*b* is excluded from the area printed by the head (k+1). The SoC (k+1) obtains data for printing by the head (k+1), in which the overlap data Ds (k+2) is excluded from the print data.

The data processing part 41*e* of the SoC (k+1) transmits the overlap data Ds (k+1) to the mask processing part 41*f* (see arrow B1 of FIG. 4) of the SoC (k+1). The mask processing part 41*f* of the SoC (k+1) stores the overlap data Ds (k+1) in the buffer 41*g* of the self. The mask processing part 41*f* of the SoC (k+1) generates data Ds2 (k+1) by, for example, applying the second mask to the overlap data Ds (k+1) and stores the data Ds2 (k+1) in the storing part 41*b* of the SoC (k+1) (see arrow B2 of FIG. 4). The mask processing part 41*f* of the SoC (k+1) generates data Ds1 (k+1) by, for example, applying the first mask to the overlap data Ds (k+1), and transmits the data Ds1 (k+1) to the upstream side, namely, to the SoC (k) (see arrow B3 of FIG. 4). The data Ds1 (k+1) corresponds to "first print data" and the data Ds2 (k+1) corresponds to "second print data."

The mask processing in the mask processing part 41*f* of the SoC (k+1) is executed, for example, in the following manner. The mask processing part 41*f* stores, in the buffer 41*g* of the self, the overlap data Ds (k+1) corresponding to a predetermined number of lines. The predetermined number of lines is a number corresponding to the size of each of the first mask and the second mask. In a case where the mask processing part 41*f* stores the data Ds (k+1) corresponding to the predetermined number of lines, the mask processing part 41*f* generates the data Ds2 (k+1) by, for example, applying the second mask to the data Ds (k+1) corresponding to the predetermined number of lines, and generates the data Ds1 (k+1) by, for example, applying the first mask to the data Ds (k+1) corresponding to the predetermined number of lines. The mask processing can be executed efficiently by accumulating the overlap data Ds (k+1) corresponding to the number of the lines corresponding to the size of each of the first mask and the second mask and by applying each of the first mask and the second mask to the accumulated overlap data Ds (k+1). The predetermined number of lines may be set in accordance with the size of the mask and may be, for example, 3 to 4 lines, or lines of which number corresponding to 1 (one) page.

The data processing part 41e of the SoC (k) obtains the data Ds1 (k+1) from the downstream side, namely, from the SoC (k+1), via the communication I/F 41d (see arrow B4 of FIG. 4). The data processing part 41e of the SoC (k) stores the data Ds1 (k+1) in the storing part 41b (see arrow B5 of FIG. 4) of the SoC (k).

As described in the foregoing, the SoC (k) stores the data D (k), the data Ds2 (k) and the data Ds1 (k+1) (see FIG. 6). The controlling part 41a of the SoC (k) rewrites the data Ds (k) included in the data D (k) to the data Ds2 (k) and adds the data Ds1 (k+1) to the rewritten data D (k). Namely, the controlling part 41a of the SoC (k) generates data composed of the data Ds2 (k), the non-overlap data Dt (k), and the data Ds1 (k+1) and drives the head (k) based on this data.

The data processing part 41e of the SoC (k+2) obtains the print data from the upstream side, namely, from the SoC (k+1) via the communication I/F 41c. The data processing part 41e of the SoC (k+2) obtains, from the print data, the data D (k+2) corresponding to the self, namely, to the SoC (k+2), and stores the data D (k+2) in the storing part 41b of the SoC (k+2). The data processing part 41e of the SoC (k+2) transmits the print data from which the data D (k+2) is excluded to the downstream side, namely, to an SoC (k+3) via the communication I/F 41d.

The data D (k+2) includes the overlap data Ds (k+2) and non-overlap data Dt (k+2) (see FIG. 6). The overlap data Ds (k+2) is data for performing printing on an overlap area 42b in which the area printed by the head (k+1) and an area printed by the head (k+2) overlap. The overlap data Ds (k+2) corresponds to "second overlap data." The non-overlap data Dt (k+2) is data which does not include the overlap data Ds (k+2) and does not include overlap data Ds (k+3) for performing printing on an overlap area 42b in which the area printed by the head (k+2) and an area printed by a head (k+3) overlap. Namely, the non-overlap data Dt (k+2) is data for performing printing on an area in which the overlap area 42b is excluded from the area printed by the head (k+2).

The data processing part 41e of the SoC (k+2) transmits the overlap data Ds (k+2) to the mask processing part 41f of the SoC (k+2). The mask processing part 41f of the SoC (k+2) stores the overlap data Ds (k+2) in the buffer 41g of the self. The mask processing part 41f of the SoC (k+2) generates data Ds2 (k+2) by, for example, applying the second mask to the overlap data Ds (k+2) and stores the data Ds2 (k+2) in the storing part 41b of the SoC (k+2). The data Ds2 (k+2) corresponds to "fourth print data." The mask processing part 41f of the SoC (k+2) generates data Ds1 (k+2) by, for example, applying the first mask to the overlap data Ds (k+2) and transmits the data Ds1 (k+2) to the upstream side, namely, to the SoC (k+1). The data Ds1 (k+2) corresponds to "third print data."

The data processing part 41e of the SoC (k+1) obtains the data Ds1 (k+2) from the downstream side, namely, from the SoC (k+2) via the communication I/F 41d (see arrow B8 of FIG. 4). The data processing part 41e of the SoC (k+1) stores the data Ds1 (k+2) in the storing part 41b (see arrow B9 of FIG. 4) of the SoC (k+1).

As described in the foregoing, the SoC (k+1) stores the data D (k+1), the data Ds2 (k+1) and the data Ds1 (k+2) (see FIG. 6; the arrows A5, B2 and B9 of FIG. 4). The controlling part 41a of the SoC (k+1) rewrites the data Ds (k+1) included in the data D (k+1) to the data Ds2 (k+1) and adds the data Ds1 (k+2) to the rewritten data D (k+1). Namely, the controlling part 41a of the SoC (k+1) generates data composed of the data Ds2 (k+1), the non-overlap data Dt (k+1), and the data Ds1 (k+2), and drives the head (k+1) based on this data. An SoC (2) to the SoC (k−1), the SoC (k+2) to an SoC (n−1) execute printing processing similar to those executed by the SoC (k) and the SoC (k+1).

The data processing part 41e of the SoC (1) obtains the print data from the upstream side, namely, from the main controlling circuit 7a, via the communication I/F 41c. The data processing part 41e of the SoC (1) obtains, from the print data, data D (1) corresponding to the self, namely, to the SoC (1), and stores the data D (1) in the storing part 41b of the SoC (1). The data processing part 41e of the SoC (1) transmits the print data from which the data D (1) is excluded to the downstream side, namely, to the SoC (2) via the communication I/F 41d.

Although the data D (1) includes the non-overlap data Dt (1), the data D (1) does not include the overlap data Ds (1), since no head is present upstream of the head (1). The non-overlap data Dt (1) is data which does not include the overlap data Ds (1) and which does not include overlap data Ds (2) for performing printing on an overlap area 42b in which an area printed by the head (1) and an area printed by a head (2) overlap. Namely, the non-overlap data Dt (1) is data for performing printing on an area in which the overlap area 42b is excluded from the area printed by the head (1).

The data processing part 41e of the SoC (1) obtains data Ds1 (2) from the downstream side, namely, from the SoC (2), via the communication I/F 41d. The data processing part 41e of the SoC (1) stores the data Ds1 (2) in the storing part 41b of the SoC (1).

As described in the foregoing, the SoC (1) stores the data D (1) and the data Ds2 (1). The controlling part 41a of the SoC (1) generates the data D (1), namely, data composed of the non-overlap data Dt (1) and the data Ds1 (2), and drives the head (1) based on this data.

The data processing part 41e of the SoC (n) obtains the print data from the upstream side, namely, from the SoC (n−1), via the communication I/F 41c. The data processing part 41e of the SoC (n) obtains, from the print data, data D (n) corresponding to the self, namely, to the SoC (n), and stores the data D (n) in the storing part 41b. Since the SoC (n) is disposed at the downstream-most position, the SoC (n) does not transmit the print data to the downstream side.

The data D (n) includes overlap data Ds (n) and non-overlap data Dt (n). The overlap data Ds (n) is data for performing printing on an overlap area 42b in which an area printed by a head (n−1) and the area printed by the head (n) overlap. The non-overlap data Dt (n) is data which does not include the overlap data Ds (n). Namely, the non-overlap data Dt (n) is data for performing printing on an area in which the overlap area 42b is excluded from the area printed by the head (n). Since the head (n) is disposed at the downstream-most position, no head is present downstream of the head (n). Accordingly, no overlap data is also present for performing printing on an overlap area in which the area printed by the head (n) and an area printed by a head disposed downstream of the head (n) overlap.

The data processing part 41e of the SoC (n) transmits the overlap data Ds (n) to the mask processing part 41f of the SoC (n). The mask processing part 41f of the SoC (n) stores the overlap data Ds (n) in the buffer 41g of the self. The mask processing part 41f of the SoC (n) generates data Ds2 (n) by, for example, applying the second mask to the overlap data Ds (n) and stores the data Ds2 (n) in the storing part 41b of the SoC (n). The mask processing part 41f of the SoC (n) generates data Ds1 (n) by, for example, applying the first mask to the overlap data Ds (n), and transmits the data Ds1 (n) to the upstream side, namely, to the SoC (n−1). Note that since the SoC (n) is disposed at the downstream-most position, the SoC (n) does not obtain the data from the downstream side.

As described in the foregoing, the SoC (n) stores the data D (n) and the data Ds2 (n). The controlling part 41a of the SoC (n) rewrites the data Ds (n) included in the data D (n) to the data Ds2 (n). Namely, the controlling part 41a of the SoC (n) generates data composed of the data Ds2 (n) and the non-overlap data Dt (n) and drives the head (n) based on this data.

The main controlling circuit 7a adds, to a header of the print data, identifiers which include a first identifier identifying the overlap data Ds (k+1) and a second identifier identifying the overlap data Ds (k+2), and each of which identifies overlap data Ds (g) ("g" represents a natural number in a range of 2 to n), and transmits the print data added with the identifiers to the SoC group 410. For example, the data processing part 41e of the SoC (k+1) refers to the first identifier and obtains the overlap data Ds (k+1), and the mask processing part 41f of the SoC (k+1) generates the data Ds1 (k+1) and the data Ds2 (k+1) based on the overlap data Ds (k+1). The data processing part 41e of the SoC (k+2) refers to the second identifier and obtains the overlap data Ds (k+2), and the mask processing part 41f of the SoC (k+2) generates the data Ds1 (k+2) and the data Ds2 (k+2) based on the overlap data Ds (k+2).

Note that the SoC may also rewrite an identifier indicating the overlap data and transmit the print data to the downstream side. For example, the main controlling circuit 7a adds an identifier identifying the overlap data Ds (2) to the header of the print data and transmits the print data to the SoC group 410. The data processing part 41e of the SoC (2) refers to the identifier identifying the overlap data Ds (2) and obtains the overlap data Ds (2). The data processing part 41e of the SoC (2) rewrites the identifier identifying the overlap data Ds (2) to an identifier identifying overlap data Ds (3) and transmits the print data to the downstream side. In such a manner, the SoCs sequentially rewrite the identifiers; the data processing part 41e of the SoC (k+1) refers to the first identifier and obtains the overlap data Ds (k+1); and the mask processing part 41f of the SoC (k+1) generates the data Ds1 (k+1) and the data Ds2 (k+1), based on the overlap data Ds (k+1). The data processing part 41e of the SoC (k+1) rewrites the first identifier to the second identifier and transmits the print data to the SoC (k+2). The data processing part 41e of the SoC (k+2) refers to the second identifier and obtains the overlap data Ds (k+2), and the mask processing part 41f of the SoC (k+2) generates the data Ds1 (k+2) and the data Ds2 (k+2), based on the overlap data Ds (k+2). The data processing part 41e of the SoC (k+2) rewrites the second identifier to an identifier indicating the overlap data Ds (k+3) and transmits the print data to the SoC (k+3). Note that each of the identifiers is associated with one of the multiple overlap data.

In the printing apparatus 1, according to the embodiment, the SoC (k+1) generates the first print data with which the head (k) performs the printing in the overlap area and the second print data with which the head (k+1) performs the printing in the overlap area. Namely, since the main controlling circuit 7a is not required to generate the print data for performing the printing in the overlap area, the load of the main controlling circuit 7a can be reduced or prevented from increasing. Further, each of the SoCs may generate the print data regarding the overlap area of the head of the self and another head on the upstream side. Accordingly, even in a case where the number of heads is increased, the load of the generating processing of generating the data for performing the printing in the overlap area is not increased in each of the SoCs.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Note that the computer program can be developed to be executed on a single computer or on a plurality of computers which is located in one site or distributed over a plurality of sites and which are interconnected by a communication network.

The embodiments disclosed herein are examples in all senses and should be interpreted not restrictive or limiting in any way. The scope of the present disclosure is intended to encompass all the changes within the scope of the claims and a scope equivalent to the scope of the claims. The technical features described in the embodiments can be combined. Further, the independent claims and the dependent claims described in the claims can be combined with each other in all and any combinations, irrespective of the form of reference therebetween.

What is claimed is:
1. A printing apparatus comprising:
a main controlling circuit;
a sub-controlling circuit group which includes a plurality of sub-controlling circuits connected in series and including a k-th sub-controlling circuit and a k+1-th sub-controlling circuit (k representing a natural number); and
a head group which includes a plurality of heads controlled by the sub-controlling circuit group and including a k-th head driven by the k-th sub-controlling circuit and a k+1-th head driven by the k+1-th sub-controlling circuit, wherein
in a case where the main controlling circuit transmits print data to the sub-controlling circuit group, the k-th sub-controlling circuit is configured to execute obtainment of, from the print data, data for performing printing by the k-th head, and to execute transfer of the print data, from which the obtained data is excluded, to the k+1-th sub-controlling circuit, the print data includes overlap data for printing in an overlap area where an area to be printed by the k-th head and an area to be printed by the k+1-th head overlap, and the k+1-th sub-controlling circuit is configured to execute generation of, based on the overlap data, first print data for printing in the overlap area by the k-th head and second print data for printing in the overlap area by the k+1-th head.

2. The printing apparatus according to claim 1, wherein the sub-controlling circuit group is configured to perform bidirectional communication, and the k+1-th sub-controlling circuit is configured to execute transmission of the first print data to the k-th sub-controlling circuit.

3. The printing apparatus according to claim 1, wherein the k+1-th sub-controlling circuit is configured to execute the generation of the first print data and the second print data every time the k+1-th sub-controlling circuit obtains the print data corresponding to a predetermined number of lines.

4. The printing apparatus according to claim 1, wherein the k-th sub-controlling circuit is configured to obtain data with which the printing is performed by the k-th head and in which the overlap data is excluded from the print data.

5. The printing apparatus according to claim 1, wherein the sub-controlling circuit group includes a k+2-th sub-controlling circuit, the head group includes a k+2-th head driven by the k+2-th sub-controlling circuit, the print data includes second overlap data with which the printing is performed in a second overlap area, the area printed by the k+1-th head and an area printed by the k+2-th head overlapping in the second overlap area, the main controlling circuit is configured to add, to the print data, a first identifier by which the overlap data is identified and a second identifier by which the second overlap data is identified, and to transmit the print data, to the sub-controlling circuit group, and the k+1-th sub-controlling circuit is configured to execute:
obtainment of the overlap data by referring to the first identifier;
generation of the first print data and the second print data based on the overlap data; and
transmission of the print data to the k+2-th sub-controlling circuit, and the k+2-th sub-controlling circuit is configured to execute:
obtainment of the second overlap data by referring to the second identifier; and
generation of, based on the second overlap data, third print data with which the k+1-th head performs the printing in the second overlap area, and fourth print data with which the k+2-th head performs the printing in the second overlap area.

6. The printing apparatus according to claim 1, wherein the sub-controlling circuit group includes a k+2-th sub-controlling circuit, the head group includes a k+2-th head driven by the k+2-th sub-controlling circuit, the print data includes second overlap data with which the printing is performed in a second overlap area, the area printed by the k+1-th head and an area printed by the k+2-th head overlapping in the second overlap area, the k-th sub-controlling circuit is configured to add, to the print data, a first identifier by which the overlap data is identified, and to transmit the print data, to the k+1-th sub-controlling circuit, the k+1-th sub-controlling circuit is configured to execute:
obtainment of the overlap data by referring to the first identifier;
the generation of the first print data and the second print data, based on the overlap data; and
rewriting of the first identifier to a second identifier by which the second overlap data is identified, and transmission of the print data to the k+2-th sub-controlling circuit, and the k+2-th sub-controlling circuit is configured to execute:
obtainment of the second overlap data by referring to the second identifier; and
generation of third print data for printing in the second overlap area by the k+1-th head, and fourth print data for printing in the second overlap area by the k+2-th head, based on the second overlap data.

7. A method of generating print data executable by a printing apparatus including: a main controlling circuit; a sub-controlling circuit group which includes a plurality of sub-controlling circuits connected in series and including a k-th sub-controlling circuit and a k+1-th sub-controlling circuit (k representing a natural number); and a head group which includes a plurality of heads controlled by the sub-controlling circuit group and including a k-th head driven by the k-th sub-controlling circuit and a k+1-th head driven by the k+1-th sub-controlling circuit, the method comprising:
causing the k-th sub-controlling circuit to execute obtainment of data for printing by the k-th head from the print data, and to execute transfer of the print data, from which the obtained data is excluded, to the k+1-th sub-controlling circuit, in a case where the main controlling circuit transmits print data to the sub-controlling circuit group;

causing the k+1-th sub-controlling circuit to execute generation of first print data for printing in an overlap area by the k-th head and second print data for printing the overlap area by the k+1-th head, based on overlap data which is included in the print data and with which the printing is performed in the overlap area, the overlap area being an area where an area printed by the k-th head and an area printed by the k+1-th head overlap.

8. A non-transitory computer-readable medium storing a computer program for controlling a printing apparatus including: a main controlling circuit, a sub-controlling circuit group which includes a plurality of sub-controlling circuits connected in series and including a k-th sub-controlling circuit and a k+1-th sub-controlling circuit (k representing a natural number), and a head group which includes a plurality of heads controlled by the sub-controlling circuit group and including a k-th head driven by the k-th sub-controlling circuit and a k+1-th head driven by the k+1-th sub-controlling circuit, the computer program comprising:
causing the k-th sub-controlling circuit to execute obtainment of data for printing by the k-th head from the print data and causing the k-th sub-controlling circuit to execute transfer of the print data, from which the obtained data is excluded, to the k+1-th sub-controlling circuit, in a case where the main controlling circuit transmits print data to the sub-controlling circuit group;

causing the k+1-th sub-controlling circuit to execute generation of, first print data for printing in an overlap area by the k-th head and second print data for printing in the overlap area by the k+1-th head, based on overlap data which is included in the print data and with which the printing is performed in the overlap area, the overlap area being an area where an area printed by the k-th head and an area printed by the k+1-th head overlap.

\* \* \* \* \*